June 6, 1961 H. G. McCARTY 2,986,863
PICK-UP
Filed Dec. 23, 1958 2 Sheets-Sheet 1

INVENTOR.
HORACE G. McCARTY
BY Joseph Allen Brown
ATTORNEY.

June 6, 1961  H. G. McCARTY  2,986,863
PICK-UP
Filed Dec. 23, 1958  2 Sheets-Sheet 2
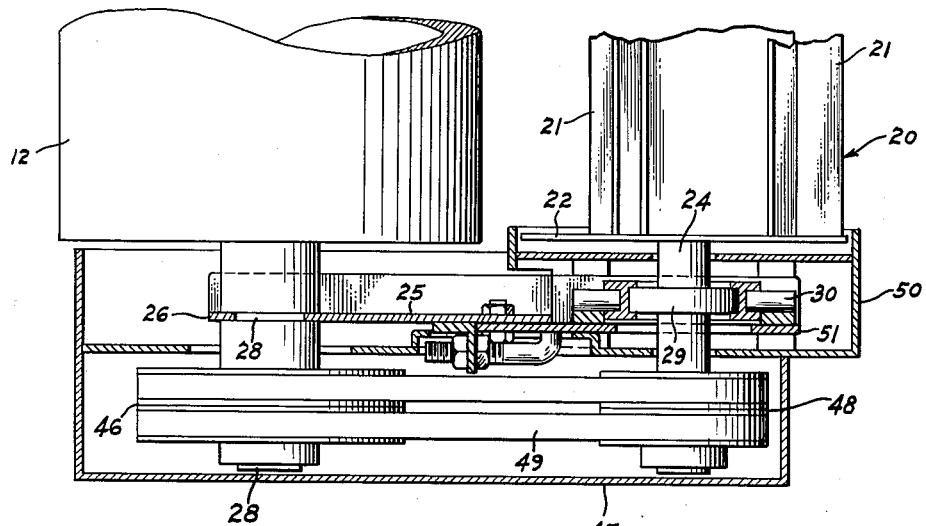
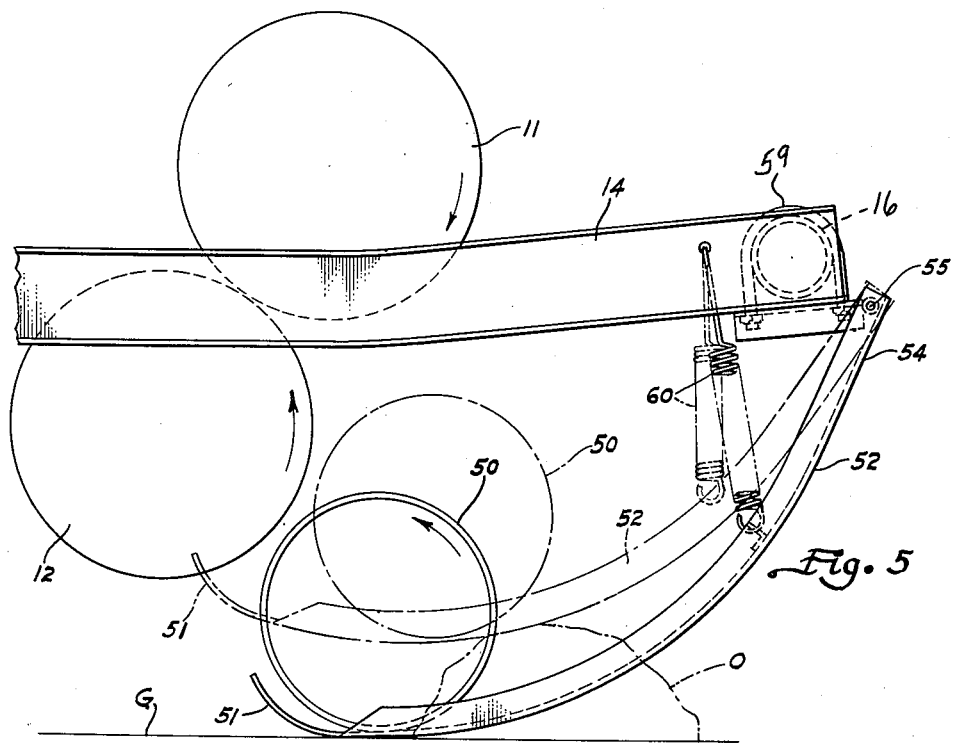
INVENTOR.
HORACE G. McCARTY
BY Joseph Allen Brown
ATTORNEY United States Patent Office 2,986,863
Patented June 6, 1961

2,986,863
PICK-UP
Horace G. McCarty, New Holland, Pa., assignor to Sperry Rand Corporation, New Holland, Pa., a corporation of Delaware
Filed Dec. 23, 1958, Ser. No. 782,535
8 Claims. (Cl. 56—364)

This invention relates generally to agricultural machines and more particularly to crop pick-ups. Still more specifically, the invention relates to the provision of ground runners for a pick-up to protect it, and its supporting linkages, from damage.

An important object of this invention is to provide runners for use with a pick-up, such runners being responsive to variations in ground conditions and connected to the pick-up to raise and lower it responsive to such conditions.

Another object of this invention is to provide runners disposed in front of a pick-up to respond to a given ground condition and transmit such response to the pick-up before the pick-up reaches such condition.

Another object of this invention is to provide pick-up runners which are retracted when the pick-up is elevated to an inoperative, transport position.

A further object of this invention is to provide runners which assist in preventing the bunching of material in front of supports at the respective ends of the pick-up and also assist the pick-up in dividing the material to be picked up from adjacent material.

A still further object of this invention is to provide a runner conntruction which is relatively simple and low in cost.

Other objects of this invention will be apparent hereinafter from the specification and from the recital in the appended claims.

In the drawings:

FIG. 4 is a fragmentary section showing the lower roll of the crusher, the pick-up and the drive-support of the pick-up from the lower roll; and FIG. 5 is a generally diagrammatic side elevation illustrating the operation of the runners and the reaction of the pick-up.

In general, applicant's invention resides in the provision of runners positioned on a mobile frame and forwardly of a pick-up. The runners are mounted to swing about transverse pivotal connections with the frame upon encountering an obstacle. They have rearward ends which normally rest on the ground. The pick-up is carried on the frame and is "floatable" up and down relative thereto. The respective ends of the pick-up seat on the rearward ends of the runners so that when the runners swing upwardly about their pivots the pick-up is correspondingly swung.

Figure 1:
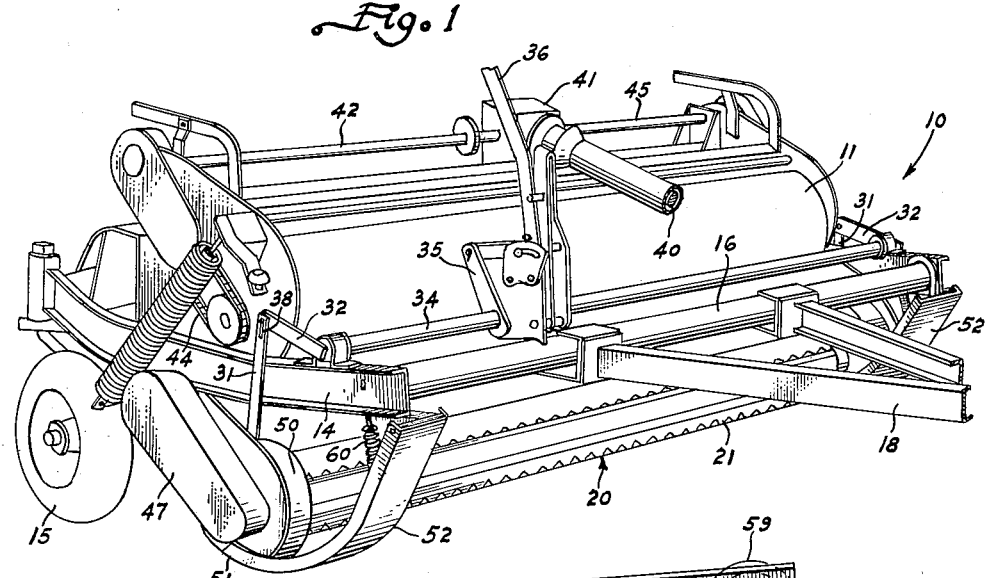
FIG. 1 is a perspective view of a crusher including its pick-up, and showing runners for the pick-up constructed according to this invention.

Referring to the drawings by numerals of reference, and particularly to FIG. 1, 10 denotes generally a hay crusher which is used as an example of a machine with which this invention may be employed. Crusher 10 comprises a pair of cooperative, horizontal, parallel rolls, namely, upper roll 11 and lower roll 12. These rolls are rotatably supported on a mobile frame 14. Frame 14 is supported at its rear by a pair of laterally spaced ground wheels 15, one of which is shown. The forward end of frame 14 has a fixed cross pipe 16 and projecting forwardly thereof are hitch members 18. The hitch members 18 are adapted to be connected to the drawbar of a tractor so that the crusher can be towed toward the right of FIG. 1 when the machine is operated.

The crusher rolls are carried on frame 14 spaced vertically from the ground G. To elevate the crop material and deliver it rearwardly to the rolls, a pick-up 20 is provided. Pick-up 20 comprises a plurality of transversely extending serrated slats 21 supported at their ends on discs 22 (FIG. 4). Projecting outwardly from discs 22 are stub shafts 24. The stub shafts are journaled in a pair of supports 25 in the form of plates which extend downwardly and forwardly from the respective ends of the lower crusher roll 12. The upper rearward ends 26 of the supports are carried on the shaft 28 for roll 12 and they are pivotal relative thereto. Thus, the pick-up may be swung up and down about the axis of shaft 28. Bearings 29 support the respective ends of the pick-up on the support 25. The bearing carriers include fore-and-aft extending pivot pins 30 which allow one end of the pick-up to pivot about its opposite end. This is provided so that when the crusher is operated and the pick-up encounters variations in ground conditions, one end of the pick-up may be elevated relative to its opposite end. Thus, the pick-up is swingable up and down about the transverse axis of the lower roll shaft 28 and also about the fore-and-aft axes of the pins 30 at the respective ends of the pick-up.

Pick-up 20 is shown in lowered operative position in the drawings. It is suspended on links 31 depending from arms 32. The arms 32 are rigid with a pivot shaft 34 mounted at its respective ends on frame 14. A crank arm 35 is provided on shaft 34 and swingable upon operation of control means including a hand lever 36 to raise or lower the pick-up. The links 31 have lost-motion connections with the arms 32 at 38 whereby the pick-up can float up or down when in lowered position without imparting movement to the arms 32.

Power is derived to operate the crusher through means which includes power-take-off shaft 40 connected at its forward end, not shown, to the tractor power shaft and terminating at its rear end in a gear box 41. From one side of gear box 41 a drive shaft 42 projects. Shaft 42 is connected through sprocket means, not shown, to an endless chain 44 which is connected to and drives upper crusher roll 11. Out of the opposite side of gear box 41 is a drive shaft 45 suitably connected through chain and sprocket means, not shown, to the lower roll 12. Pick-up 20 is rotated through a connection with the lower roll 12 as shown in FIG. 4. At one end of roll 12, the shaft 28 carries a double pulley 46 connected with a double pulley 48 on the stub shaft 24 of the pick-up through belts 49. A hood 47 covers the endless drive. The rotation of the crusher rolls and the pick-up is indicated by the arrows in FIG. 5.

The above structure is conventional and plays no part in the present invention except to establish that the rotatable pick-up 20 is supported on the frame 14 for up and down movement relative thereto when in lowered operative position. The invention resides in the runner arrangement provided, which will now be described.

Figure 2:
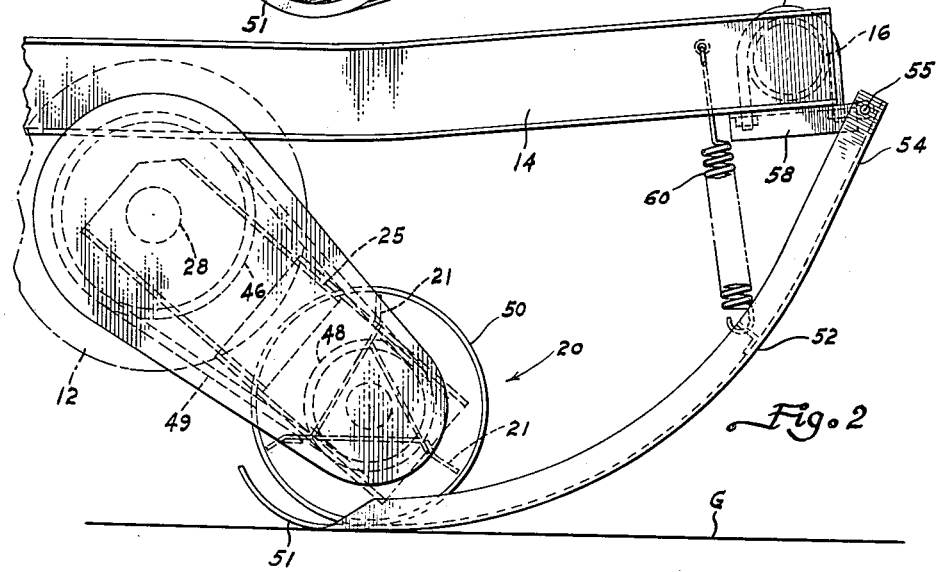
FIG. 2 is a fragmentary side elevation, on an enlarged scale, showing the relation of the pick-up and the runners therefor.
Figure 3:
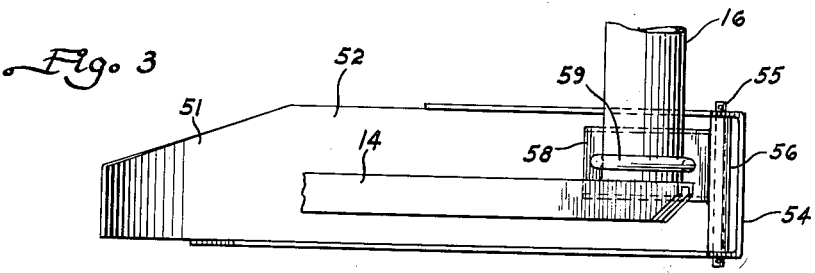
FIG. 3 is a plan view of one of the runners and illustrating the details of its supporting structure.

At each end of pick-up 20 there is provided a circular, wheel-like member 50 affixed to the lower forward end 51 of support 25 (FIG. 4). When the pick-up 20 rotates, it rotates relative to the circular members 50. Each member 50 seats on the rearward end 51 of an arcuate runner 52, there being one runner at each side of the machine and registering, respectively, with the ends of the pick-up. Each runner 52 extends downwardly and rearwardly from cross pipe 16 to a point just rearwardly of the pick-up 20. The rearward end 51 rests on the ground G when the pick-up is in lowered operative position. The upper forward end 54 of each runner is pivotally supported on a pivot pin 55 (FIG. 3) rotatable in a sleeve 56 integral with a block 58 connected to cross pipe 16 by a U-shaped bracket 59. Connected between frame 14 and each runner 52 is a tension spring 60 which constantly biases the runner 52 to swing in a clockwise direction (FIG. 2) about pin 55. The springs are provided to retract the runners when the hand lever 36 is utilized to elevate the pick-up 20 to an inoperative, transport position. When the pick-up is in lowered operative position, the weight of the pick-up resting on the rearward ends 51 of the runners extend the springs 60 and hold the runners 52 against the ground G. The springs 60 are relatively light and while they are sufficient to elevate the ground runners, they are insufficient to elevate the pick-up.

Since the runners 52 are disposed forwardly of the pick-up, they anticipate a variation in ground condition before the pick-up reaches such condition. As shown in FIG. 5, when the crusher is operating normally, each runner 52 will engage the ground and the pick-up will move close to the ground. However, when an obstacle O is encountered, the runner engaging it will be pivoted about its pin 55 and caused to swing rearwardly and upwardly, to the dotted position shown in FIG. 5. Since the adjacent end of the pick-up is seated on the runner, it swings up when the runner swings up.

Each runner 52 swings rearwardly and upwardly about its forwardly disposed pivot pin 55. The pick-up swings forwardly and upwardly about the rotational axis of the lower roll 12, or shaft 28. With this structure, a force developed upon engagement of a runner with an obstacle, exerts only an upward force against the pick-up. There is no rearward component of force directed against the pick-up. Therefore, the supporting linkages for the pick-up are not subjected to shock loads and damage when a runner engages an obstacle.

It will be also noted that each runner is made from steel which is U-shaped in cross section, the bight of the U facing upwardly. The outer flange of each runner provides a guide and a shield for the adjacent end of the pick-up. Further, when the crusher is in operation, the runners prevent the bunching of material in front of the circular members 50. Likewise, they tend to hold down the crop material as they pass over it, the material disposed inwardly of the runners being free for engagement by the pick-up members 21 and elevation and delivery to the crusher rolls. Therefore, the runners assist the pick-up in achieving a separation of the material to be picked up from adjacent material.

In view of the pivot points for the pick-up and the runners, there is relative motion between the circular members 50 at the end of the pick-up and the runners when the runners swing upwardly. However, the wheel-like circular members readily slide on the upper surfaces of the runners.

The structure described has great utility in areas where irrigation ditches are employed. When an irrigation ditch is crossed, the runners engage the far wall of the ditch as it is crossed and swing the pick-up upwardly before such wall is engaged by the pick-up thereby preventing the pick-up from "bulldozing."

While this invention has been described in connection with a crusher and a pick-up therefor, it will be understood that the invention could be employed in other comparable environments. This application is intended to cover any variations, uses, or adaptations of the invention, following in general the principles of the invention and including such departures from the present disclosure as come within the known or customary practice in the art to which the invention pertains and as fall within the scope of the invention or the limits of the appended claims.

Having thus described my invention, what I claim is:

1. In agricultural machinery, a mobile frame adapted for ground travel forwardly, a pair of runners pivotally connected to said frame and extending downwardly and rearwardly therefrom, said runners having rear ends adjacent the ground, a pick-up extending transverse to said ground travel, said pick-up having ends engaging said rear ends of said runners and being longitudinally movable relative thereto, and means supporting said pick-up on said frame for vertical movement relative thereto.

2. In agricultural machinery, a mobile frame adapted for ground travel forwardly, a pair of runners pivotally connected to said frame and extending downwardly and rearwardly therefrom, said runners having rear ends adjacent the ground, a pick-up extending transverse to said ground travel, said pick-up having ends engaging said rear ends of said runners and being longitudinally movable relative thereto, means carried on said frame and connected to said pick-up for selectively positioning the pick-up in an elevated inoperative position or a lowered operative position, said positioning means including a lost-motion connection whereby the pick-up may move vertically relative to said frame, and spring means connected between said frame and said runners constantly biasing said rear ends of said runners upwardly toward said frame.

3. In agricultural machinery, a mobile frame adapted for ground travel forwardly, a pick-up extending transverse to said ground travel, a pair of supports, one at each end of said pick-up, means connecting said pair of supports to said frame whereby the supports and the pick-up may move relative thereto, and means for controlling such movement and for protecting said pick-up comprising a pair of laterally spaced runners extending forwardly of the pick-up, said runners being downwardly and rearwardly inclined and having forward ends and rear ends, means connecting said forward ends to said frame for pivotal movement about axes parallel to the extension of said pick-up, said rearward ends engaging the ground and said pair of supports resting on said rearward ends and being free to move longitudinally relative to said runners, whereby when said rearward ends move up and down about said forward ends responsive to variations in ground conditions, said pick-up is correspondingly moved.

4. An agricultural machine as recited in claim 3 wherein there is mechanical means carried on said frame and connected to said pick-up for raising the pick-up, and there is also provided spring means connected between said frame and said runners constantly urging the rearward ends of the runners upwardly and toward said frame.

5. In agricultural machinery, a mobile frame adapted for ground travel forwardly, a pair of downwardly and forwardly extending laterally spaced supports, said supports having forward ends and rear ends, a pair of circular members affixed, respectively, to said forward ends of said supports, a rotatable pick-up extending transversely relative to said ground travel, means connecting said pick-up to said circular members for rotation relative thereto, means connecting the rear ends of said supports to said frame for pivotal movement about an axis parallel to the extension of said pick-up whereby the pick-up may move vertically relative to said frame, and means for controlling such moving and for protecting said pick-up comprising a pair of laterally spaced, downwardly and rearwardly extending runners, said runners having forward ends and rear ends, means pivotally connecting said runner forward ends to said frame and forwardly of said pick-up, said rear ends of said runners resting on the ground and supporting said circular members and thereby said pick-up, said runners swinging up and down relative to said frame responsive to variations in ground conditions and producing a corresponding swinging movement of said pick-up.

6. In agricultural machinery as recited in claim 5, wherein there is means carried on said frame and connected to said pick-up for selectively positioning said pick-up in a raised inoperative position or a lowered operative position, and there is also provided spring means connected between the frame and said runners constantly urging the rearward ends of the runners upwardly and toward said frame.

7. An agricultural machine as recited in claim 5 wherein each of said runners is arcuate and U-shaped in cross section, with the bight of the U facing upwardly, each of said circular members being slidable on its associated runner.

8. In agricultural machinery, a mobile frame adapted for ground travel, a transversely extending crop pick-up, a pair of ground engaging runners extending forwardly of said pick-up, means attaching said runners to said frame for movement relative thereto in response to variations in ground conditions, means mounting said pick-up on said frame for vertical movement relative thereto, and means connecting said pick-up and said runners for longitudinal movement relative to each other, said runners when moved relative to said frame in response to variations in ground conditions correspondingly moving said pick-up relative to said frame and said runners.

References Cited in the file of this patent

UNITED STATES PATENTS

| | | |
|---|---|---|
| 1,891,748 | Clove | Dec. 20, 1932 |
| 2,699,031 | MacDonald | Jan. 11, 1955 |
| 2,703,957 | Russell | Mar. 15, 1955 |
| 2,774,246 | Happe et al. | Dec. 18, 1956 |
| 2,821,061 | Pilcher et al. | Jan. 28, 1958 |